United States Patent
Hosokoshiyama

(10) Patent No.: US 9,511,892 B2
(45) Date of Patent: Dec. 6, 2016

(54) BIAXIAL STRETCH BLOW-MOLDED CONTAINER

(71) Applicant: Hiroshi Hosokoshiyama, Tokyo (JP)

(72) Inventor: Hiroshi Hosokoshiyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 76 days.

(21) Appl. No.: 14/421,615

(22) PCT Filed: Sep. 17, 2013

(86) PCT No.: PCT/JP2013/074968
§ 371 (c)(1),
(2) Date: Feb. 13, 2015

(87) PCT Pub. No.: WO2014/069116
PCT Pub. Date: May 8, 2014

(65) Prior Publication Data
US 2015/0210420 A1    Jul. 30, 2015

(30) Foreign Application Priority Data

Oct. 31, 2012    (JP) ................................. 2012-240144

(51) Int. Cl.
*B65D 1/40* (2006.01)
*B65D 23/02* (2006.01)
(Continued)

(52) U.S. Cl.
CPC ................ *B65D 1/40* (2013.01); *B29B 11/14* (2013.01); *B29C 45/1603* (2013.01);
(Continued)

(58) Field of Classification Search
CPC ............ B65D 1/40; B29C 49/08; B29C 49/22
(Continued)

(56) References Cited

U.S. PATENT DOCUMENTS 5,344,045 A * 9/1994 Richter et al. .................... 222/1
6,649,121 B1 11/2003 Hamamoto et al.
(Continued)

FOREIGN PATENT DOCUMENTS

JP    H04-28507 A    1/1992
JP    2001-105478 A    4/2001
(Continued)

OTHER PUBLICATIONS

Jan. 7, 2014 International Search Report issued in International Application No. PCT/JP2013/074968.

(Continued)

*Primary Examiner* — Robert J Hicks
*Assistant Examiner* — Kareen Thomas
(74) *Attorney, Agent, or Firm* — Oliff PLC

(57) ABSTRACT

A biaxially stretched, blow molded container is obtained by molding a laminated test tube shaped preform molded by an injection molding process. The container has a neck, a body, and a bottom, and having an outer shell and an inner bag to be laminated in a peelable manner with an outer layer inner surface. The inner bag can be deflated under a pressure drop therein. The outer layer and an inner layer have a laminar structure in which the lamination extends from a predetermined position of the neck to a lower end face. The layers are peeled from each other, starting from a lamination interface between the layers. This interface is exposed outside at the lower end face of the gate mark and can be used as an air intake vent that enables outside air to be taken into the space between the layers.

3 Claims, 14 Drawing Sheets

(51) Int. Cl.
  *B65D 1/02* (2006.01)
  *B32B 27/32* (2006.01)
  *B32B 27/36* (2006.01)
  *B29C 49/08* (2006.01)
  *B29C 49/22* (2006.01)
  *B29C 45/16* (2006.01)
  *B29B 11/14* (2006.01)
  *B32B 7/12* (2006.01)
  *B32B 7/14* (2006.01)
  *B32B 27/08* (2006.01)
  *B32B 27/30* (2006.01)
  *B32B 1/02* (2006.01)
  *B29C 49/06* (2006.01)
  *B29L 9/00* (2006.01)

(52) U.S. Cl.
  CPC .......... *B29C 45/1646* (2013.01); *B29C 49/08* (2013.01); *B29C 49/22* (2013.01); *B32B 1/02* (2013.01); *B32B 7/12* (2013.01); *B32B 7/14* (2013.01); *B32B 27/08* (2013.01); *B32B 27/306* (2013.01); *B32B 27/32* (2013.01); *B32B 27/36* (2013.01); *B65D 1/0215* (2013.01); *B65D 23/02* (2013.01); *B29B 2911/1408* (2013.01); *B29B 2911/14053* (2013.01); *B29B 2911/14066* (2013.01); *B29B 2911/14093* (2013.01); *B29B 2911/14146* (2013.01); *B29B 2911/14153* (2013.01); *B29B 2911/14493* (2013.01); *B29C 49/06* (2013.01); *B29L 2009/001* (2013.01); *B32B 2250/24* (2013.01); *B32B 2307/518* (2013.01); *B32B 2439/00* (2013.01); *B32B 2439/60* (2013.01)

(58) Field of Classification Search
  USPC .......... 220/495.01, 495.03, 495.05, 495.06, 220/495.07; 215/12.2
  See application file for complete search history.

(56) References Cited

U.S. PATENT DOCUMENTS

| | | | | |
|---|---|---|---|---|
| 2009/0230074 A1* | 9/2009 | Toyoda | ............... | B29C 49/0073 215/12.2 |
| 2011/0180509 A1* | 7/2011 | Hutchinson et al. | ........ | 215/12.1 |

FOREIGN PATENT DOCUMENTS

| JP | 2003-072785 A | 3/2003 |
|---|---|---|
| JP | 2004-330672 A | 11/2004 |
| JP | 2008-114856 A | 5/2008 |
| JP | 2010-082916 A | 4/2010 |

OTHER PUBLICATIONS

Jan. 7, 2014 Written Opinion of the International Searching Authority issued in International Application No. PCT/JP2013/074968.

* cited by examiner (a)

(b)

(a)

(b)

(c)

(a)

(b)

RELATED ART

RELATED ART

BIAXIAL STRETCH BLOW-MOLDED CONTAINER

TECHNICAL FIELD

This invention relates to a biaxially stretched, blow molded container made of synthetic resins, which comprises an outer layer that forms an outer shell and an inner layer that forms an inner bag.

BACKGROUND ART

Patent document D1 describes an invention relating to a container, the so-called the "delaminable bottle," which is molded by a direct blow molding process, and in which an inner layer that forms a free-to-deflate inner bag is laminated in a peelable manner with an inner surface of an outer layer that forms an outer shell. The delaminable bottle of this kind is in use as a discharge container of a squeeze type combined with a cap having a check valve installed or as a discharge container combined with a manual pump.

FIG. 12 is a side view showing a typical example of the discharge container of the squeeze type using a delaminable bottle as the container main-body. FIG. 13 is cross-sectional view taken along line G-G in FIG. 12. This discharge container is a delaminable bottle obtained by the direct blow molding process (a process for using an extruded cylindrical parison and blow molding the parison into a bottle in a mold). A cap 109 having two check valves 109Va, 109Vb is screwed on a neck 102 of a container main-body 101. The container main-body 101 has a laminar structure in which an inner layer 112 for forming an inner bag 107 that can be deflated with the decrease in volume of a content fluid is laminated in a peelable manner with an outer layer 111 that forms an outer shell 106. An air intake vent 119 is open in a portion of the outer shell 106 of the neck 102 to take in outside air.

In the case of the discharge container utilizing such a delaminable bottle as described above, there is a pressure drop inside the inner bag 107 after the content fluid L has been discharged. At that time the inner layer 112 peels from the outer layer 111, thus allowing the inner bag 107 to be deflated with the decrease in the volume of the content fluid. Under this condition, the check valve 109Va works to prevent outside air from entering the inside of the inner bag 107, while the check valve 109Vb also works in cooperation. Because of the actions and effects of these two valves, the quality of the content fluid L is effectively protected against deterioration. Outside air is taken into a space between the outer layer 111 and the inner layer 112 in a volume as much as the volume of the content fluid that has been discharged. After a portion of the content fluid has been discharged, the outer shell 106 can be restored to its original shape. Thus, the discharge container has high performance in the aspects of usability and outer appearance.

As often observed in the discharge containers of this type, when the inner bag 107 deforms with the decrease in the volume of the content fluid L, the inner layer 112 on one side comes in close contact with the counterpart on 10 the other side. In that case, flow channels F may get narrow on the way, or even get clogged completely to a point where the ability of the container to discharge the content fluid L is damaged. Still another problem is that it may become impossible to utilize the content fluid L to the last drop. In this respect, the patent document D1 describes a pair of adhered zones 113a where the outer 15 layer 111 is adhered to the inner layer 112 through the intermediary of these adhesive layers 113, which are disposed at symmetrical positions on the central axis of the container main-body 101. As shown in FIG. 13 by two-dot chain lines 112a, 112b, the inner layer 112 that forms the inner bag 107 is controlled to have a certain configuration when the inner bag 107 deforms. In 20 this way, the flow channels F are secured until the content fluid L is cleared off.

The delaminable bottle obtained by the direct blow molding, such as described above, has a bottom seal 108 formed when the parison is pinched off (see FIG. 12). This bottom 108 has a laminar structure comprising an outer layer 111, an inner layer 112, and an outer layer 111, as viewed in vertical section. Although the outer layer 111 in itself is in a steady state, and surrounds the inner layer 112 in tight contact. But since the outer layer 111 and the inner layer 112 are originally formed in a peelable state, this bottom seal 108 can be used as an air intake vent by partially separating between the outer layer 111 and the inner layer 112. On the other hand, there arises an intrinsic problem that a crack tends to open, starting from this bottom seal 108.

In the meantime, the patent document D2 describes an invention of a bottle container to be used as a delaminable bottle, which is obtained by biaxially stretching and blow molding a preform in a shape of a test tube, wherein an outer container and an inner container both made of synthetic resins are put together by an insert molding process to give the bottle a double wall. Such a delaminable bottle of the biaxially stretched, blow molded container enables at least the outer shell to be molded by using a polyethylene terephthalate (PET) resin, which is known to be difficult to mold by means of the direct blow molding process. The delaminable bottle thus obtained can take advantage of such properties as strength, stiffness, gas barrier property, transparency, and glaze, all of which are demonstrated by this biaxially stretched, blow molded container made of a PET resin, or the so-called PET bottle.

The patent document D3 describes an injection molding device utilizing a multi-nozzle section having cylindrical outer, middle, and inner flow channels disposed concentrically and also having a cylindrical joined flow 10 channel disposed at the ends of these flow channels. This document also shows a laminated preform molded by this device so as to have a laminar structure in which an intermediate layer is laminated with, and embedded in, the substrate layers. FIG. 14 shows an example of the preform to be molded by using this device. The preform 201 has a laminar structure in which an 15 intermediate layer 212 having a high gas barrier property is laminated with, and sandwiched between, two substrate layers 211 made of a PET resin in a height range excluding an upper portion of a neck 201 and an entire bottom 205. When this preform 201 is biaxially stretched and blow molded, the container thus obtained has a higher gas barrier property than has the 20 container made of only the PET resin by the intermediate layer 212.

PRIOR ART REFERENCES

Patent Documents

Patent document D1: JP2003-072785 A
Patent document D2: JP2010-082916 A
Patent document D3: JP2004-330672 A

SUMMARY OF THE INVENTION

Problems to be Solved by the Invention

Conventional biaxially stretched, blow molded delaminable bottles utilize double-walled preforms obtained by an insert molding process such as described in the patent document D2 or by different process steps to fit an inner container to a test-tube-like outer container. This requires injection molding twice, and there arises a problem of low productivity because production requires a step of fitting the inner container into the outer container and an additional step involving insert molding. The available laminar structure is limited to two layers. Like the delaminable container of FIGS. 12 and 13 obtained by the direct blow molding process, it is not easy industrially from the viewpoints of productivity and repeatability to fix the outer layer 111 and the inner layer 112 by using adhesive layers 113a in a shape of a vertical zone. Even if use is made of the delaminable bottles formed by biaxial stretching and blow molding the double-walled preforms, the bottles now in use have little control over the way of the inner bag to deform.

In both of the laminated preform made by an injection molding process using a multi-nozzle section and the container obtained by molding biaxially stretching and blow molding this preform, it is the intermediate layer laminated with the substrate layers, such as shown in FIG. 14, that usually serves to perform the functions of a gas barrier property, a light blocking effect, an aroma retaining property, and the like. However, it is difficult for the laminar structure of this kind to be applied to the delaminable containers.

Concerning a container biaxially stretched, blow molded from a laminated preform obtained by an injection molding process utilizing a multi-nozzle section, it is a technical problem of this invention to create a delaminable function that is comparable to that of the delaminable bottles made by a direct blow molding process. An object of this invention is to provide a high-performance delaminable bottle while taking advantage of the characteristics of a biaxially stretched, blow molded container.

Means of Solving the Problems

Among the means of solving the above-described technical problems, a main feature of this invention is a container obtained by biaxially stretching and blow molding a laminated preform in a shape of a test tube, the preform being molded by an injection molding process using a multi-nozzle section, and the container being a bottle having a neck, a body, and a bottom, and comprising:

an outer layer that forms an outer shell, and an inner layer that forms an inner bag to be laminated in a peelable manner with an inner surface of this outer layer, wherein the inner layer is formed to have so thin a wall that the inner bag can be deflated under a pressure drop inside the inner bag caused by a decrease in volume of a content fluid;

the outer layer and the inner layer are of a laminar structure in which the lamination extends over an entire height range from a predetermined height position of the neck to a lower end of a gate mark, which remains at a center of a bottom plate of the bottom; and the outer layer and the inner layer are peeled from each other, starting from an interface of lamination between the outer layer and the inner layer, and this interface is exposed outside at the lower end face of the gate mark and can be used as an air intake vent that enables outside air to be taken into the space between the outer layer and the inner layer.

Under this laminar structure, the lamination of the outer layer with the inner layer extends over an entire height range from the predetermined height position of the neck to the lower end faced of the gate mark of the bottom. This structure of the bottle is taken over from the laminar structure of the preform molded by an injection molding process. Therefore, this bottle is molded by biaxially stretching and blow molding the preform having a shape of a test tube and having the laminar structure in which the lamination extends over an entire height range from the predetermined height position of the neck to the lower end face of the gate mark of the bottom.

The preform having such a laminar structure can be molding by using a multi-nozzle section having a cylindrical outer flow channel and a cylindrical inner flow channel disposed in a concentric manner and having a cylindrical joined flow channel disposed at each downstream end of the outer and inner flow channels to form a concentrically laminated mass of molten resins in which the outer-layer resin is wrapped around the inner-layer resin, and passing this laminated mass of molten resins through a sprue and gate to an injection mold, and injecting the mass of resins into a mold cavity to fill the cavity with the resins. The outer layer and the inner layer can be laminated in a peelable manner by combining the synthetic resins that are non-adherent and less compatible with each other, such as by using an outer layer made of a PET resin and an inner layer made of ethylene vinyl alcohol copolymer (EVOH) resin.

After the preform is injection molded, a sprue in a shape of a cylindrical rod is cut from the bottom to give a cut surface, where there remains a circular gate mark. At the end face of the gate mark, the interface of laminated outer and inner layers is exposed to the outside in a concentric configuration, in which the outer layer surrounds the inner layer, according to the above-described laminar structure. This gate mark of the preform is carried on to the bottom of the biaxially stretched, blow molded container in the same configuration and laminar structure. External force, such as the pushing force, can be applied by any appropriate means to the vicinity of the gate mark remaining in the bottom after the container has been molded. Then, the inner layer can be peeled from the outer layer, starting from the interface of lamination exposed outside, and it becomes possible to open an air intake vent between the outer and inner layers to take in outside air.

Another feature of this invention comprises that, in the main feature described above, adhesive layers in a shape of a vertical strip are laminated between the outer layer and the inner layer to adhere these layers to each other.

According to the above feature, like the conventional delaminable bottles obtained by direct blow molding, it becomes possible to control the behavior of the inner layer that forms the inner bag so that the inner layer would deform in a certain limited way and to secure the liquid flow channels until the content fluid is cleared off. For the layout of the adhesive layers, it is a standard practice to use a pair of the adhesive layers disposed at bilaterally symmetrical positions of the container. The height range to be covered by the adhesive layers can be appropriately determined, depending on the purpose of use. For example, if the adhesive layers are extended to a place nearby the lower end face of the gate mark, then the inner bag would be able to deform concomitantly with the decrease in volume of the content fluid while keeping the bottom wall of the inner bag in a state fixed to the outer shell. On the other hand, the adhesive layers may not be extended to the gate mark in order to increase the amount of outside air to be taken in through the air intake vent that has been formed at the gate mark.

The adhesive layers, such as described above, can be formed by using a multi-nozzle section for use in injection molding of a preform, in which vertical strip-like flow channels are disposed between the outer flow channel and the inner flow channel. An adhesive resin for adhering the outer and inner layers is flown through these vertical strip-like flow channels. At a joined flow channel, the adhesive resin formed in the shape of a vertical strip is made to flow in a laminar configuration between the resin that forms the outer layer and the resin that forms the inner layer.

Still another feature of this invention comprises that, in the main feature described above, the inner bag comprises the inner layer and an inner support layer laminated to an inner surface of the inner layer. The double layer of the inner layer and the inner support layer is formed to have so thin a wall that the inner bag can be deflated under a pressure drop inside the inner bag caused by a decrease in volume of the content fluid.

The above feature is intended to increase the injection moldability and biaxial stretching and blow molding ability of the preform, and furthermore, the water resistant property and deformability of the inner bag when it is deflated due to a decrease in content volume. If, for example, a combination of a PET resin as the outer layer and an EVOH resin as the inner layer is adopted, the use of the EVOH resin can strengthen the gas barrier property of the container. On the other hand, however, it is difficult for the EVOH resin to be used alone in both of the injection molding and the biaxial stretching and blow molding. In addition, any content fluid is required to avoid direct contact with EVOH.

Thus, an inner support layer made of a resin that can adhere to the inner layer is laminated on the inner surface of the inner layer made of the EVOH resin. When the preform is injection molded and is biaxially stretched and blow molded into a container, the inner layer is sandwiched between the outer layer and the inner support layer. In this way, it becomes possible to solve the problem associated with the moldability of the resin that forms the inner layer and to increase productivity of the container.

As for the functions of the inner bag of the container, the inner bag retains the water-resistant property, chemical-resistant property, and the like, which have to do with the protection of content fluid, by selecting an appropriate resin for use as the inner support layer, regardless of the resin used as the inner layer. Even if the inner layer is short of flexibility and fails to proceed with the volume-reducing deformation, the difficulty in deformation can be compensated by a flexible material selected for the inner support layer. The inner layer and the inner support layer can share the functions, with the gas barrier property born by the inner layer, and the water-resistant property born by the inner support layer. On the whole, there is provided a container capable of performing high functions.

Still another feature of this invention comprises that, in the above feature, the container comprises the outer layer made of a PET resin, the adhesive layer and the inner support layer made of an adhesive polyolefin (APO) resin, and the inner layer made of an EVOH resin.

The above feature is concerned with a representative laminar structure used in this invention. According to this feature, the PET resin is used as the outer layer that forms the outer shell. The use of the PET resin as the outer layer makes it possible to provide a high-performance delaminable bottle, in which effective use is made of a PET bottle obtained by the biaxial stretching and blow molding, but which is hardly found in the direct blow molded delaminable bottles. The use of the EVOH resin as the inner layer makes it possible to proceed easily with the peeling of the inner layer from the outer layer made of the PET resin and to increase the gas barrier property of the container.

The APO resin is a polyolefin resin, such as a polyethylene (PE) series resin or a polypropylene (PP) series resin, to which maleic hydride, and the like, has been grafted to introduce polar groups into the polyolefin resin. (An example is Admer, a commercial product of Mitsui Chemicals, Inc.). The APO resin has favorable injection moldability and a favorable biaxial stretching and blow molding property. It forms adhesive layers in the shape of a vertical strip within the laminating nozzle, and can firmly adhere the outer layer to the inner layer. If the APO is also used as the inner support layer, then the EVOH resin is sandwiched between the PET resin and the APO resin. In that case, both the injection molding of preform and the biaxial stretching and blow molding using this preform can be achieved smoothly with high productivity.

The molded container has an inner bag made of a double layer comprising the inner layer and the inner support layer. The content fluid directly comes in contact with the inner support layer made of the APO resin, but the APO resin has no problem from a food sanitation point of view. An APO resin having a favorable water-resistant property can also be selected, and thus, The APO resin can be trusted and used safely. By selecting a relatively flexible APO resin, it becomes possible for the inner bag to be smoothly deflated when there is a pressure drop.

The laminar structure of the biaxially stretched, blow molded container of this invention and the type of resin used for each layer of the container are, of course, not limited to those described above. For example, if a PP series resin having high moldability is used for the inner layer, then the lamination of the inner support layer can be omitted. Depending on the purpose of use, the adhered zones need not be disposed.

It is necessary for the container of this invention that a resin having a favorable biaxial stretching and blow molding property is adopted for the outer layer that forms the outer shell. In addition to the PET resin, some other usable resins include a polyethylene naphthalate (PEN) resin, a PET series resin including PET alone resin, a PP series resin, a cyclic polyolefin series resin, and the like. Although the PET resin is mainly used as a PET series resin, there can be used copolymeric polyesters comprising a major part of ethylene terephthalate units and a minor part of other polyester units, as long as the nature of the PET resin is not damaged. As the minor components of these copolymeric polyesters, there can be named, for example, dicarboxylic acid components, such as isophthalic acid, naphthalene-2,6-dicarboxilic acid, and adipic acid; and glycol components, such as propylene glycol, 1,4-butanediol, tetramethylene glycol, neopentyl glycol, cyclohexane dimethanol, and diethylene glycol. Amorphous PET resins can also be used as the PET resins. Such amorphous PET resins include PETG, a product of Eastman Chemical Company, which is a PET resin copolymerized with cyclohexane dimethanol as the glycol component.

As a PP series resin, it is preferred from a point of view of blow moldability to use a random copolymer comprising polypropylene and α-olefin having a carbon number of 2-10. Cyclic polyolefin resins are a general term for those polymers having, as the polymerizable monomer unit, cyclic olefin having an ethylenic double bond in the cycle. Specifically, Apel (Mitsui Chemicals, Inc. product) and Zeonor (Zeon Corporation product) are available commercially.

Effects of the Invention

The biaxially stretched, blow molded container of this invention having the above features has the following effects:

The container of this invention takes advantage of a biaxially stretched, blow molded container, and can avoid the problem of bottom seal cracking, which tends to occur in the delaminable bottle made by direct blow molding. The PET resin can be used for this container. As a biaxially stretched, blow molded container made of the PET resin, or the so-called PET bottle, there is provided a delaminable bottle that takes advantage of such characteristics as strength, stiffness, gas barrier property, heat-resistant property, transparency, and glaze.

This container is obtained by using a multi-nozzle section to injection mold a laminated preform in the shape of a test tube and then biaxially stretching and blow molding the preform thus obtained. As compared with conventional biaxially stretched, blow molded delaminable container obtained by fitting an inner container to an outer container, both having a shape of a test tube, or by insert molding the preform to give the preform a double wall, and then by biaxially stretching and blow molding such a preform, the container of this invention can achieve high productivity because the steps of fitting or insert molding can be omitted. A variety of laminar structures can be formed. Like the delaminable bottles made by the direct blow molding, the adhered zones in the shape of a vertical strip are disposed, and the inner layer that forms the inner bag is controlled to have a certain manner of deformation when the inner bag deflates. The flow channels inside the inner bag are secured until the content fluid is cleared off.

At the gate mark, the interface of laminated outer and inner layers is exposed to the outside in a concentric pattern, with the outer layer surrounding the inner layer. The outer layer and the inner layer are peeled from each other, starting from this interface of lamination, and thus, the gate mark can be used as an air intake vent that enables outside air to be taken into the space between the outer layer and the inner layer.

BRIEF DESCRIPTION OF THE DRAWINGS

FIG. 3(*b*), a cross-sectional view of the gate mark which has shifted from the state of 3(*a*) and is in a state in which the outer layer and the inner layer have been peeled from each other.

FIG. 4(*b*), a similar vertical sectional view taken along line C-C in FIG. 3(*a*); and FIG. 4(*c*), the gate mark in a state in which the outer and inner layers have been peeled from each other.

FIG. 8(*b*), a vertical sectional view of the bottom portion of the preform of FIG. 6, taken along line F-F.

PREFERRED EMBODIMENTS OF THE INVENTION

Figure 1:
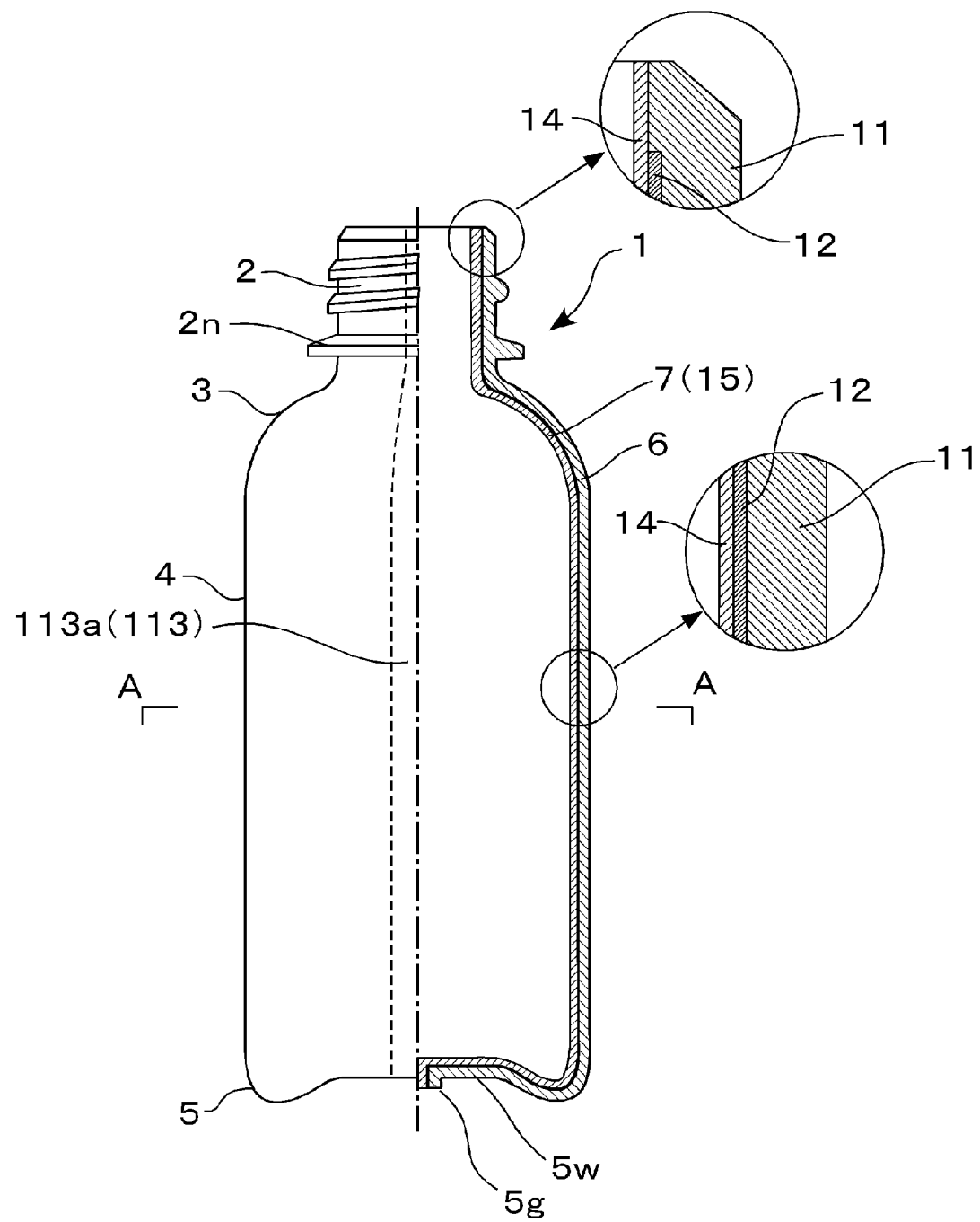
FIG. 1 is a side view showing a container in one embodiment of this invention.
Figure 2:
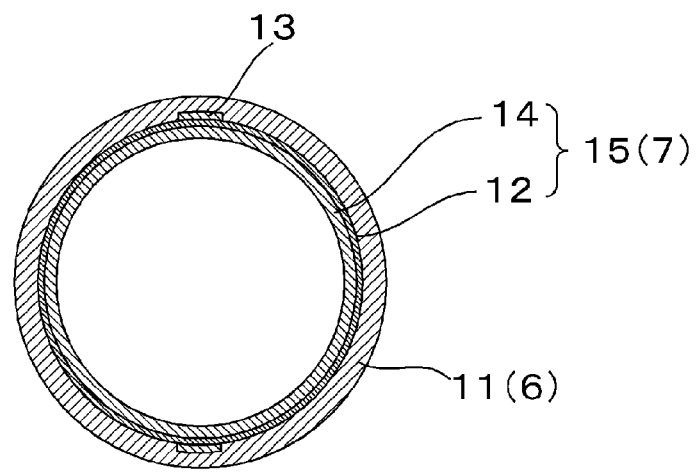
FIG. 2 is a cross-sectional view of the container taken along line A-A in FIG. 1.
Figure 3:
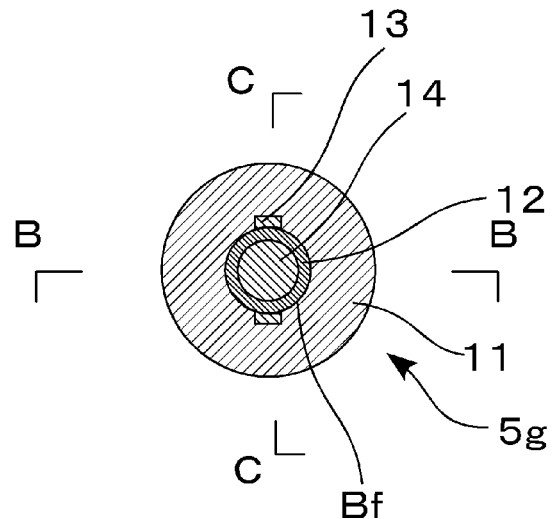
FIG. 3(*a*) is a cross-sectional view of a lower end face of the gate mark in FIG. 1 and its vicinity.
Figure 3:
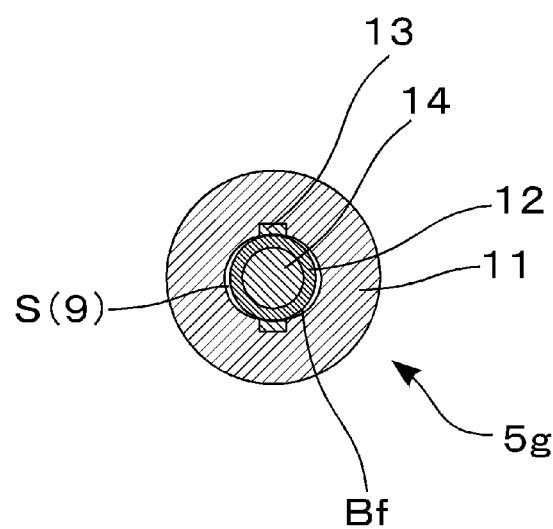
Figure 4:
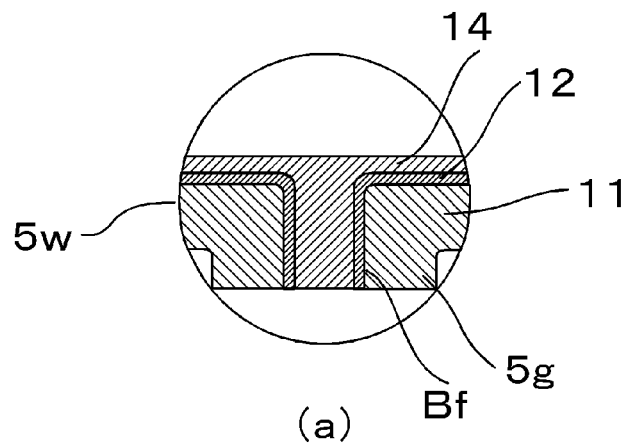
FIG. 4(*a*) is a vertical sectional view of the gate mark in FIG. 1 and its vicinity, taken along line B-B in FIG. 3(*a*)
Figure 4:
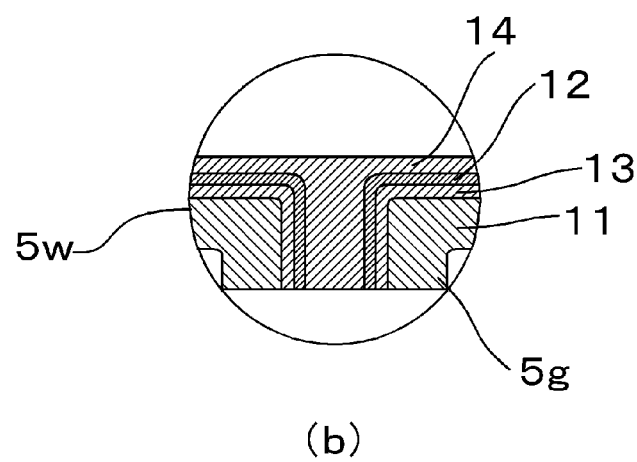
Figure 4:
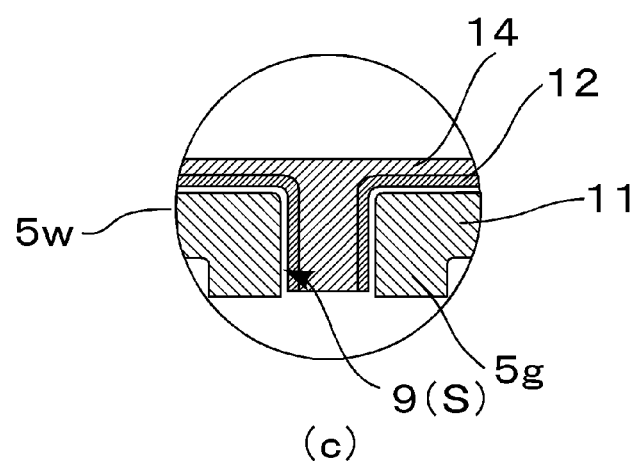

This invention is further described with respect to preferred embodiments, now referring to the drawings, in which FIGS. 1-4 are used to describe one embodiment of the biaxially stretched, blow molded container of this invention. FIG. 1 is a side view, with a right half in vertical section. FIG. 2 is a cross-sectional view of the container, taken along line A-A in FIG. 1. FIG. 3 are cross-sectional views of a lower end face of the gate mark 5*g* and its vicinity in FIG. 1. FIG. 4 are vertical sectional views of the gate mark 5*g* and its vicinity.

This container 1 is biaxially stretched and blow molded by using a preform in the shape of a test tube obtained by the injection molding, which will be described later. The container 1 is a bottle-like container comprising a neck 2, a neck ring 2*n*, a shoulder 3, a cylindrical body 4, and a bottom 5. The container 1 has a laminar structure comprising an outer layer 11 made of a PET resin that forms an outer shell, an inner layer 12 made of an EVOH resin, and an inner support layer 14 made of an APO resin (namely, Admer, a product of Mitsui Chemicals, Inc).

In this embodiment, the outer layer 11 and the inner support layer 14 are laminated over all the height range from an upper end face of the neck 2 down to a lower end face of the gate mark 5*g* which remains at the center of a bottom wall 5*w* of the bottom 5. The inner layer 12 is laminated between the outer layer 11 and the inner support layer 14, and as shown in an enlarged view near the upper end face of the neck 2 in FIG. 1, the lamination of the inner layer 12 ranges from a height position slightly below the upper end face of the neck 2 to the lower end face of the gate mark 5*g*. Such a laminar structure allows the outer layer 11 to be directly adhered to the inner support layer 14 in a portion of some length downward from the upper end face of the neck 2. This structure of the neck 2 also lends to preventing the deformation of the neck 2 and the decrease in sealing performance of the cap, because these disadvantages come from a situation in which the inner layer 12 laminated in a peelable manner may happen to be exposed from the upper end face of the neck 2 or disposed in a position right under the end face of the neck 2. The upper end position of the inner layer 12 can be determined appropriately by taking into consideration the purpose of use intended for the container, the level of gas barrier property offered by the inner layer 12, the injection moldability of the preform, and the biaxial stretching and blow molding property of the container. Depending on the purpose of use, for example, if high-level sealing is not required for the neck 2, or if the sealing can be secured by a material connected to the neck 2, then the inner layer 2 may cover all the height range from the upper end face of the neck 2 to the lower end face of the gate mark 5g.

The outer layer 11 and the inner layer 12 are laminated in a peelable manner. The inner layer 12 is laminated with the inner support layer 14 so that they are adhered to each other. The inner bag 7 is formed by a double layer 15 in which the inner layer 12 is laminated with the inner support layer 14. The double layer 15 is formed to have a thin wall so that the inner bag 7 is smoothly deflated when there is a pressure drop inside the inner bag 7. The inner layer 12 of the inner bag 7 is made of an EVOH resin, and thus, can exercise a high gas barrier property.

A pair of adhered zones 13a in the shape of a vertical strip is disposed at positions left and right of the container 1. These positions correspond to the upper and lower positions shown in the cross-sectional view of FIG. 2. At each of these positions, the adhesive layer 13 made of an APO resin is laminated between the outer layer 11 and the inner layer 12 to adhere these layers 11, 12 together in a vertical strip shape. Including the adhesive layers 13, the container 1 as a whole has a laminar structure of 3 resins and 4 layers.

The gate mark 5g derives from the injection molding of a preform, that is, the previous form of the container, and remains at the center of the bottom wall 5w of the bottom 5 of the container 1. As regards the laminar structure at the gate mark 5g and in its vicinity, the outer layer 11 and the inner layer 12 are laminated with each other in a peelable manner in the areas where the adhesive layers 13 are not disposed, as shown in FIG. 3(a) and FIG. 4(a). On the lower end face of the gate mark 5g, both of the laminar structure, as shown in the cross-sectional view of FIG. 3(a), and the interface of lamination Bf between the outer layer 11 and the inner layer 12 are in a state exposed to outside.

The laminar structure of this gate mark 5g can be utilized to open an air intake vent 9. Pushing force is applied from outside to the bottom 5 of the container 1, and in particular, to the gate mark 5g and its vicinity. Then, as shown in FIG. 3(b) or FIG. 4(c), the peeling between the outer layer 11 and the inner layer 12 is forced to go on, starting from the interface Bf of lamination, which is in a state exposed to outside. Thus, a space S is formed between these layers, and can be used as the air intake vent 9 through which outside air is taken in. According to the structure of this embodiment shown in FIG. 3(b), there is no peeling in the portions where the adhesive layers 13 are laminated. The inner bag 7 is gradually deflated under a condition that the bottom wall of the inner bag 7 remains to be fixed to the outer shell 6 at and near the gate mark 5g. The container 1 can have a structure in which the adhesive layers 13 are not extended to the gate mark 5g. With no restraint from the adhesive layers 13, the space S and the air intake vent 9 shown in FIG. 3(b) can be formed larger circumferentially, resulting in a larger amount of air intake from outside through the air intake vent 9.

As the means of applying the pushing force from outside to the gate mark 5g and its vicinity, there are various means including those using an appropriate jig after the container has been molded. For example, when the preform is biaxially stretched and blow molded, the posture of the preform is stabilized by pinching the bottom wall of the preform from inside with a stretching rod for use in vertical stretching and from outside with a so-called holding pin in a shape of a rod disposed on the bottom dies. After the container has been molded, this holding pin can be used to push the gate mark still inside the mold in order to open the air intake vent 9. Such a means does not require any additional step, and the air intake vent 9 can be formed almost simultaneously with the molding of the container.

Figure 5:
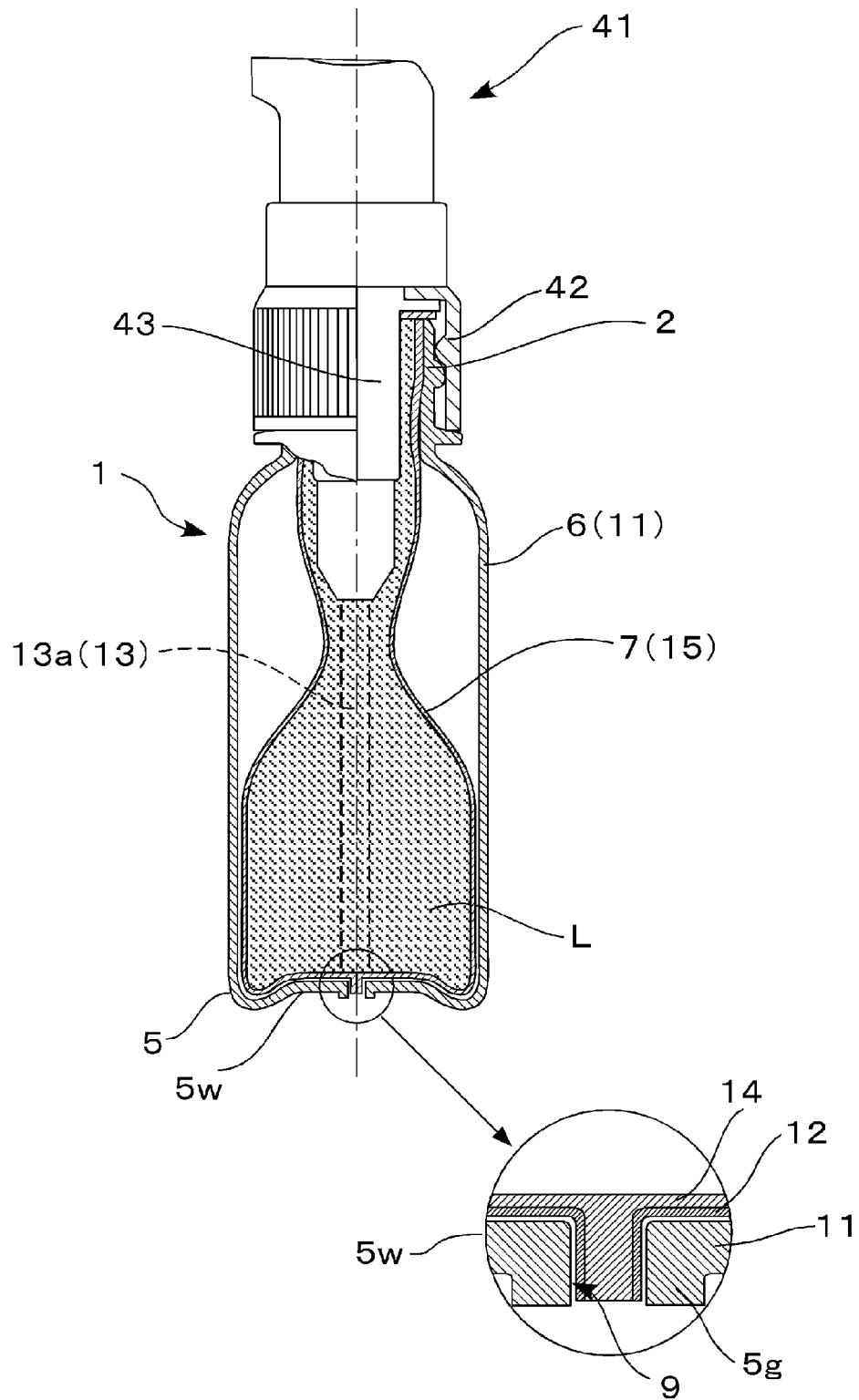
FIG. 5 is a side view, partially in vertical section, showing an example of a discharge container in which the container of FIG. 1 has been used as the container main-body.

FIG. 5 shows, partially in vertical section, an example of the discharge container in which the container 1 of FIG. 1 has been used as the container main-body of the delaminable bottle type. This discharge container 41 has a manual pump 43 fitted to the neck 2 by means of a cap unit 42.

As the content fluid L is discharged by the manual pump 43, there is a pressure drop inside the inner bag 7 made of a double layer 15 comprising the inner layer 12 and the inner support layer 14. With this pressure drop, there goes on the peeling of the inner layer 12 from the outer layer 11 so that the inner bag 7 is deflated, as shown in FIG. 5. Just as much as the inner bag 7 has been deflated, outside air would enter the space between the outer shell 6 and the inner bag 7 through the air intake vent 9 formed at the gate mark 5g. In this way, the content fluid L can be smoothly discharged.

Figure 12:
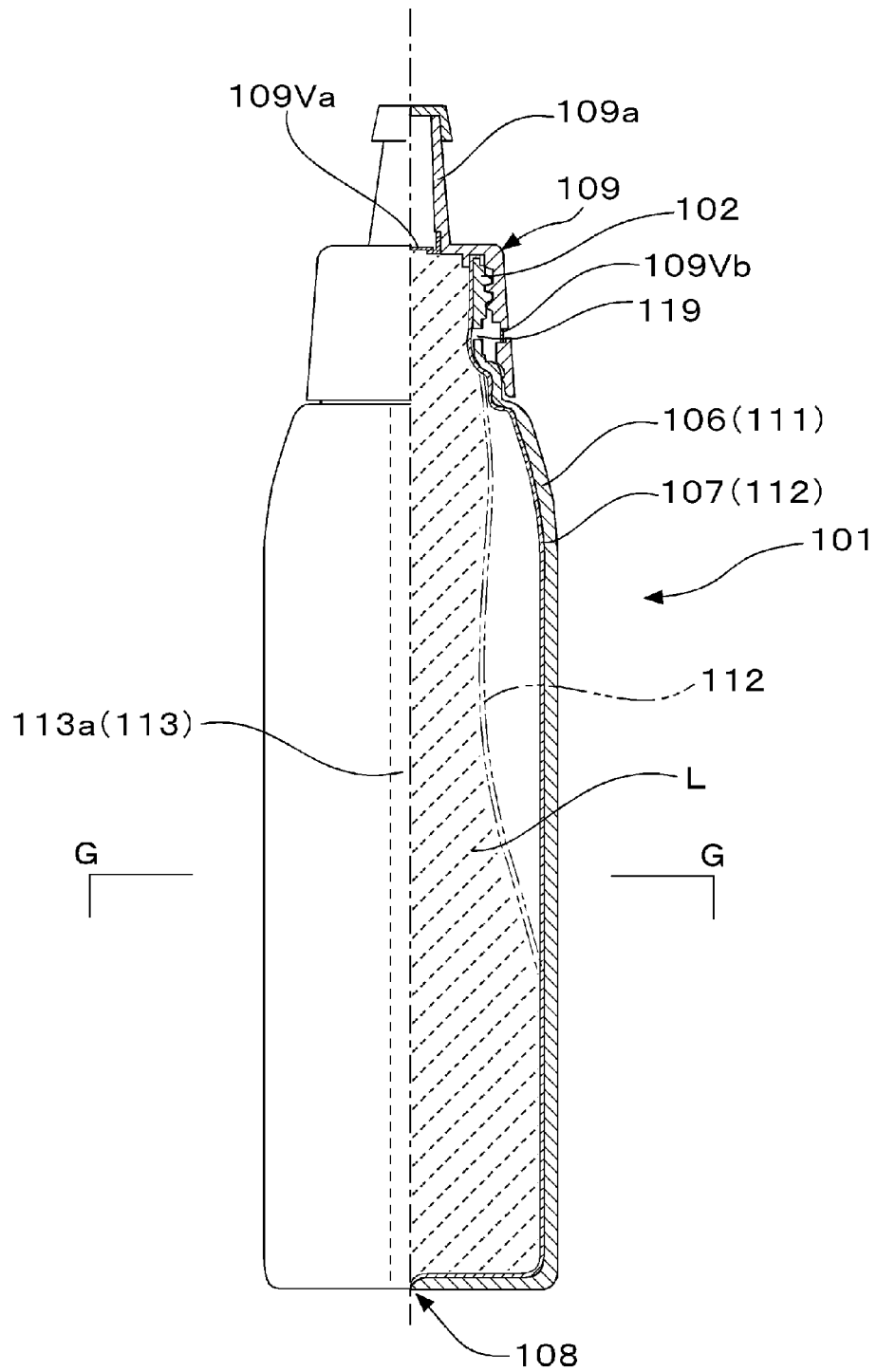
FIG. 12 is a side view, partially in vertical section, of an example of the discharge container in which a direct blow molded container is used as the container main-body.
Figure 13:
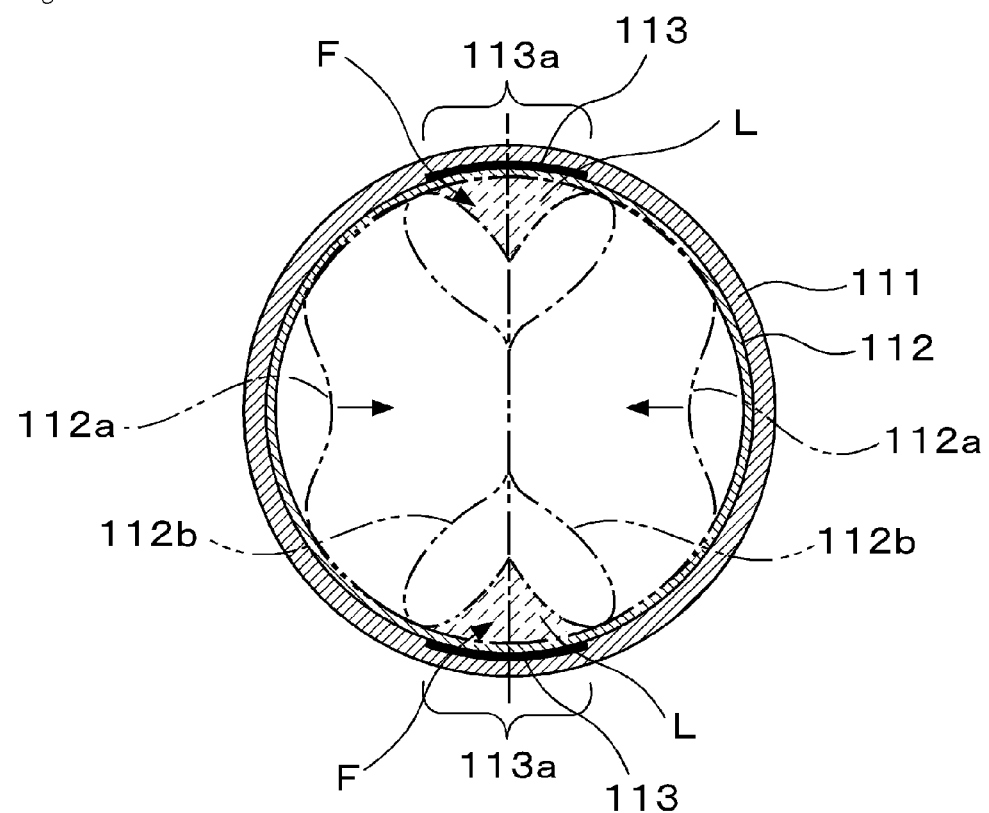
FIG. 13, shown as a cross-sectional view taken along line G-G in FIG. 12, is an explanatory diagram of the preform of FIG. 12, which shows a way of the inner bag to be deflated.

When the inner bag 7 is deflated as described above, a pair of adhered zones 13a in the shape of a vertical strip, which are disposed at positions left and right of the container 1, performs the function similar to that of the adhered zones 113a of the delaminable bottle of FIGS. 12 and 13, obtained by the direct blow molding. These adhered zones 13a serve to limit the deflation of the inner bag 7 within a certain range, and thus, can effectively solve a problem that the double layer 15 deflates unnecessarily at an early stage of discharging the content fluid L and may block the flow passages for the content fluid L when one side of the double layer 15 comes closely attached to the other side of the double layer 15.

Figure 6:
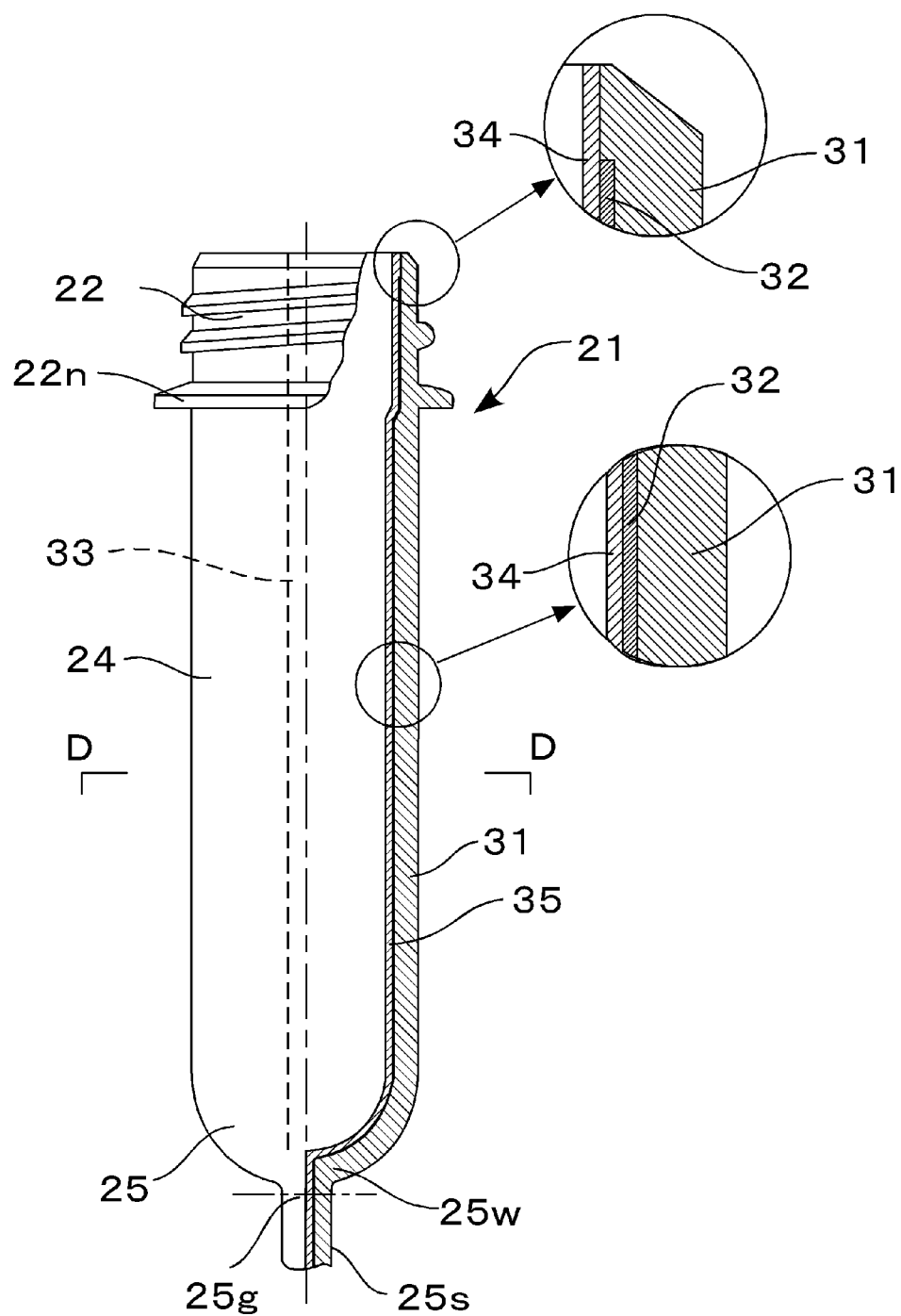
FIG. 6 is a side view, partially in vertical section, showing a preform, the previous form of the container of FIG. 1.
Figure 7:
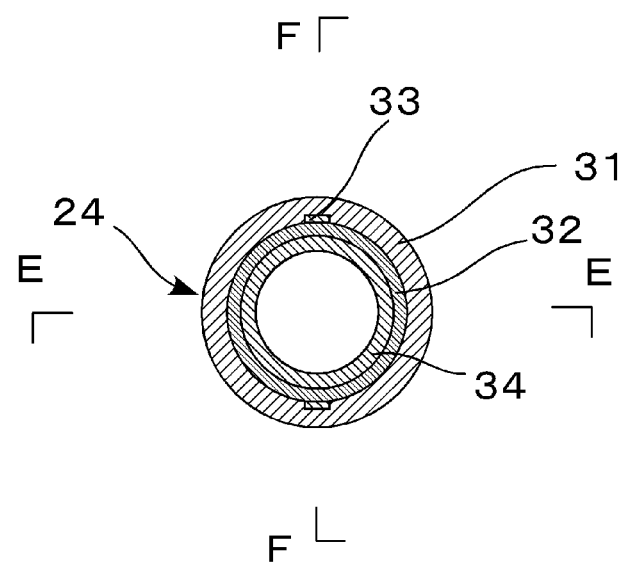
FIG. 7 is a cross-sectional view of the preform in FIG. 6, taken along line D-D in FIG. 6.
Figure 8:
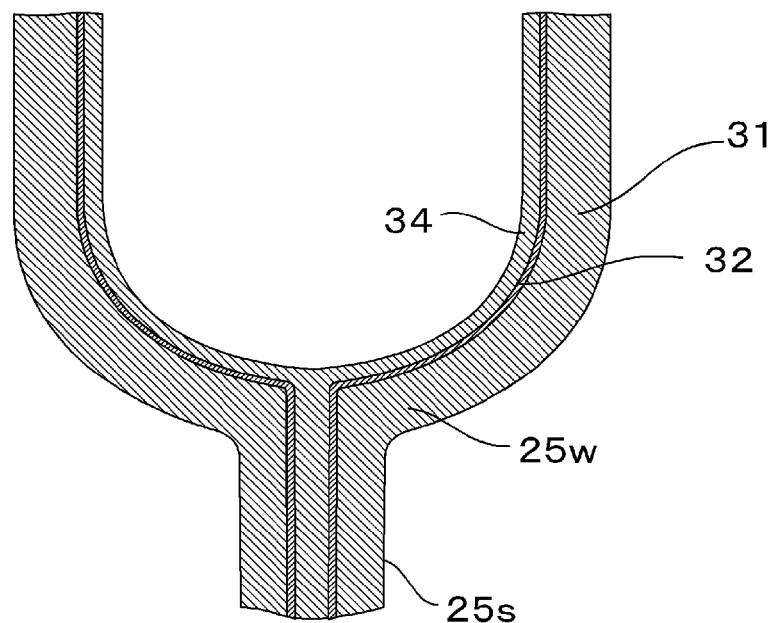
FIG. 8(*a*) is a vertical sectional view of a bottom portion of the preform of FIG. 6, taken along line E-E in FIG. 6.
Figure 8:
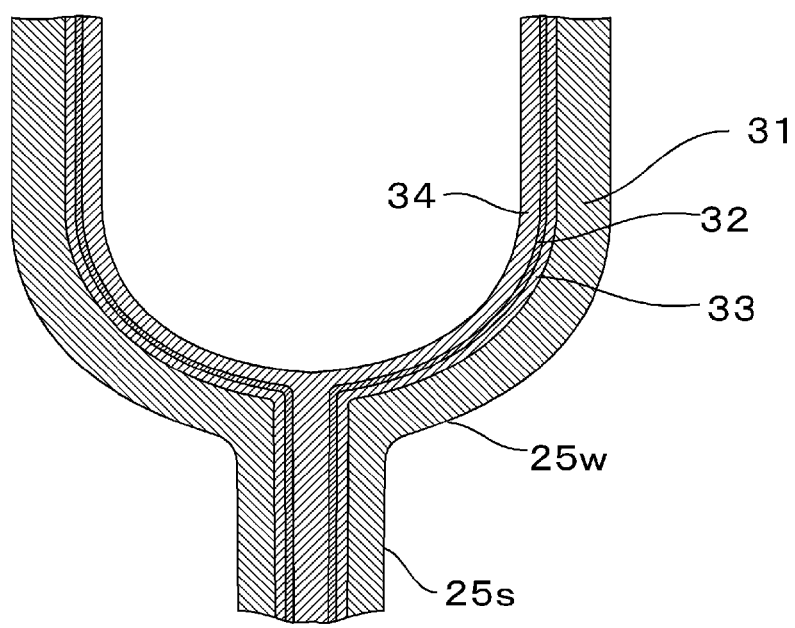

FIGS. 6, 7, and 8 show a preform, which is the previous form or precursor of the container 1 of FIG. 1. FIG. 6 is a side view, partially in vertical section, of the preform. FIG. 7 is a cross-sectional view of the preform, taken along line D-D in FIG. 6. FIG. 8(a) is a vertical sectional view of the bottom 25 and its vicinity, taken along line E-E; and FIG. 8(b), the counterpart taken along line F-F.

This preform 21 has generally a shape of a test tube and comprises a neck 22, a neck ring 22n, a body 24, and a bottom 25. The preform 21 has a laminar structure comprising an outer layer 31 made of a PET resin, an inner layer 32 made of an EVOH resin, and an inner support layer 34 made of an APO resin, all of which are laminated over an entire height and along an entire circumferential length. At left and right positions (at the upper and lower positions in the cross-sectional view of FIG. 7), a pair of adhesive layers 33 in the shape of a vertical strip is laminated between the outer layer 31 and the inner layer 32 over the entire height range so that both the outer layer 31 and the inner layer 32 are adhered to the adhesive layers 33 to form a pair of vertical adhered zones. As shown in a circle of an enlarged view of an upper portion of the neck 32, the lamination of the inner layer 32 starts from a height position somewhat below the upper end face of the neck 22, just as it is so in the case of the inner layer 12 of the container 1 shown in FIG. 1.

FIG. 6 shows the preform 21 in a state in which a sprue 25s has not yet been cut after the injection molding. When this sprue 25s is cut out, there remains a gate mark 25g in the bottom wall 25w of the bottom 25 of the preform 21. This gate mark 25g would not deform after the preform 21 is biaxially stretched and blow molded into the container 1. Thus, the shape and laminar structure found in the gate mark 25g are taken over by the container 1 shown in FIGS. 1, 3, and 4.

More specifically, FIG. 8(a) is a vertical sectional view of the bottom 25 and its vicinity including the sprue 25s, taken along line E-E indicated in FIG. 7. FIG. 8(b) is a counterpart taken along line F-F. FIG. 8(a) shows a laminar structure comprising the outer layer 31, the inner layer 32, and the inner support layer 34. FIG. 8(b) shows another laminar structure comprising the outer layer 31, the adhesive layer 33, the inner layer 32, and the inner support layer 34. All these layers extend throughout the preform 21 from the neck 22 to the sprue 25s. This laminar structure is carried on to the gate mark 5g remaining in the bottom 5 of the container 1. As described above, the laminar structure shown in the cross-sectional view of FIG. 3(a) and the interface Bf of lamination formed between the outer layer 11 and the inner layer 12 are exposed to outside on the lower end face of the gate mark 5g of the container 1.

Figure 14:
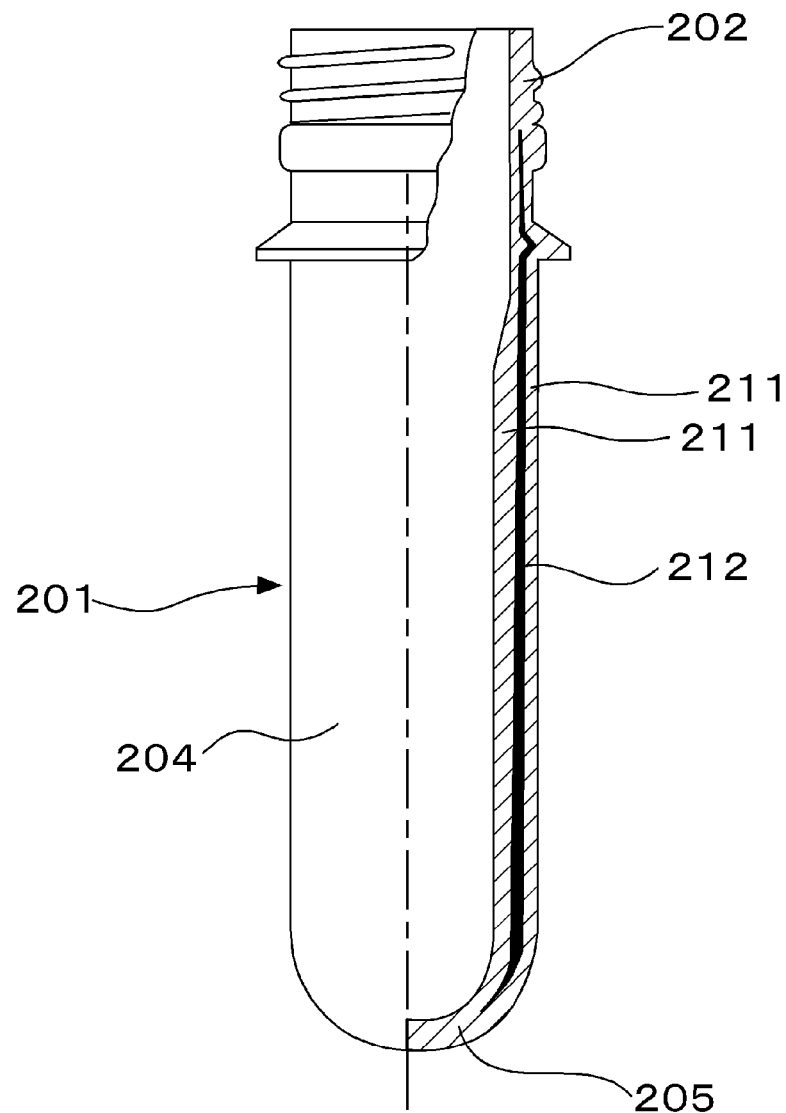
FIG. 14 is a front view, partially in vertical section, of an example of a conventional laminated preform.

As shown in FIG. 14, the conventional laminated preform 201 has a laminar structure in which the intermediate layer 212 is sandwiched between, and embedded in, the substrate layers 211 in a height range excepting an upper portion of the neck 202 and the entire bottom 205. On the other hand, the laminar structure of the preform 21 shown in FIGS. 6-8 is similar to that of a parison, which is the precursor used when the container main-body 101 shown in FIG. 12 is molded by the direct blow molding. This parison is characterized by a laminar structure which extends through the main-body from neck to the lower face of the gate mark 25g. Since the laminar structure is maintained throughout the main-body, it has become possible for the biaxially stretched, blow molded container 1 to perform the delaminating function that is comparable to the delaminable bottle obtained by the direct blow molding, while avoiding such a problem as bottom cracks found in the direct blow molded container.

Figure 9:
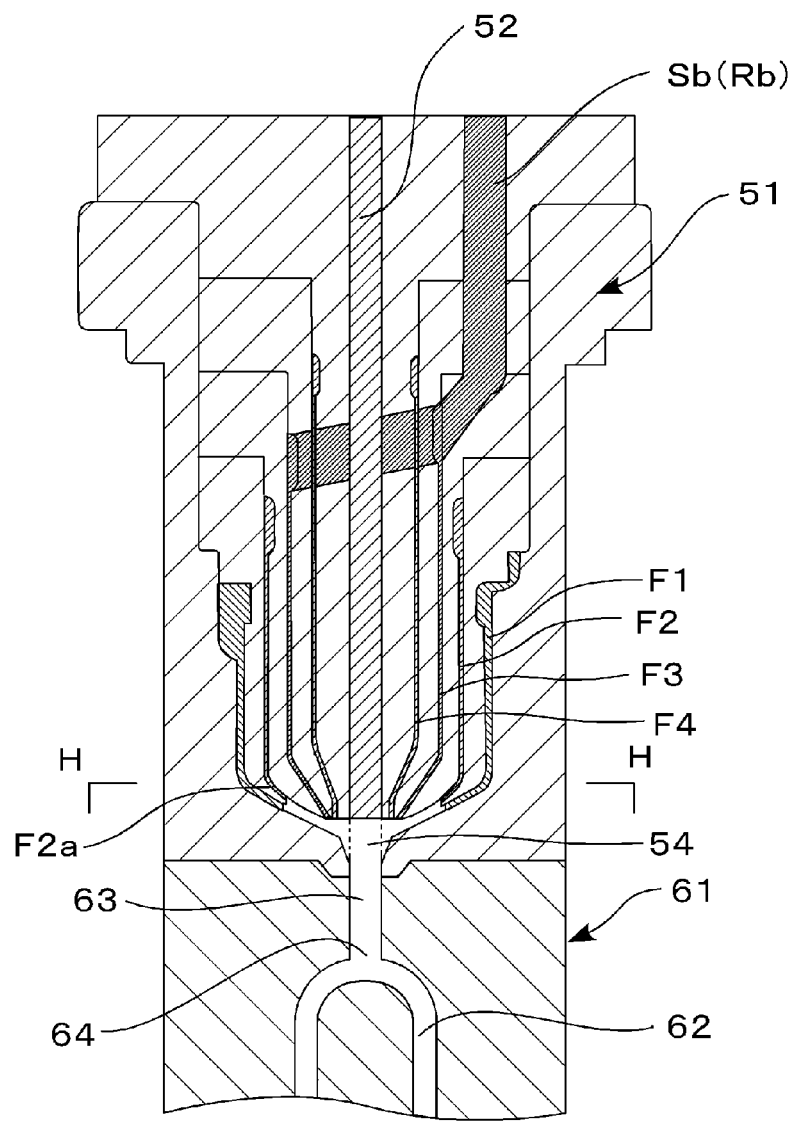
FIG. 9 is a schematic diagram, in vertical section taken from a front direction, showing an example of the injection molding device used to mold the preform of FIG. 6.
Figure 10:
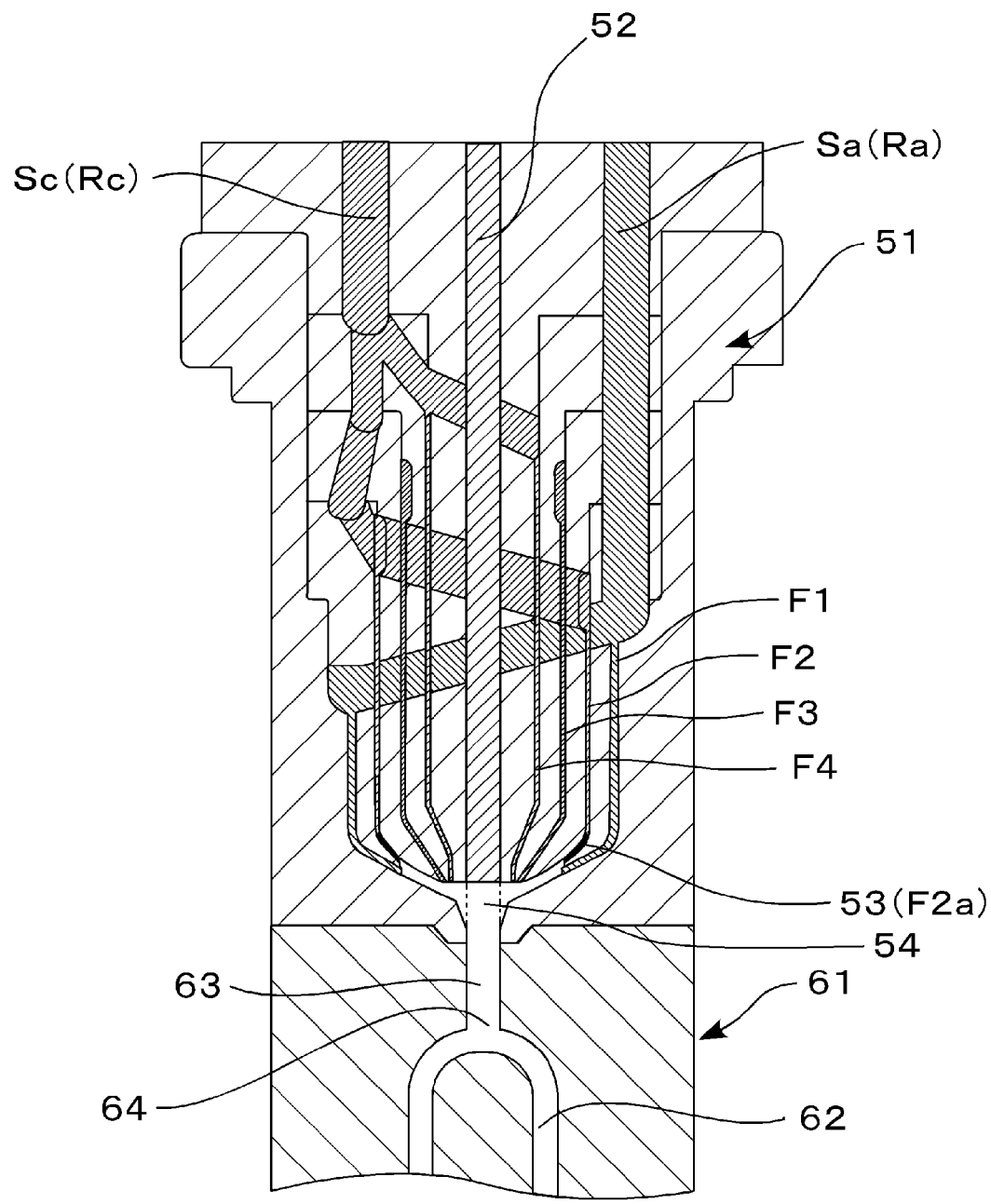
FIG. 10 is a schematic diagram, in vertical section taken from a side direction, showing the same device as shown in FIG. 9 to be used to mold the preform of FIG. 6.
Figure 11:
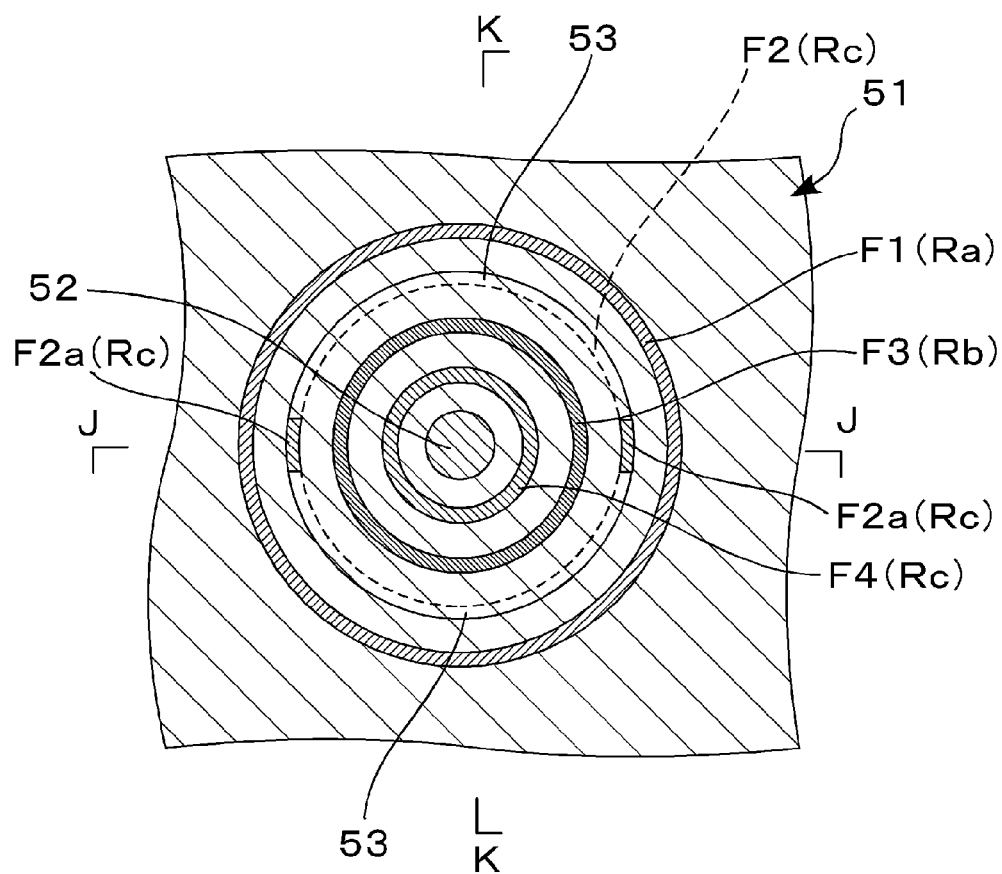
FIG. 11 is a schematic diagram, in cross-section taken along line H-H in FIG. 9, showing a structure of cylindrical flow channels inside the multi-nozzle section of the injection molding device of FIGS. 9, 10.

FIGS. 9, 10, and 11 are schematic diagrams depicting an example of the device for injection molding the preform 21 that has a laminar structure comprising 3 resins and 4 layers, such as shown in FIGS. 6 and 7. FIG. 9 is a vertical sectional view of the exemplary injection molding device used to mold the preform, taken from a front direction (i.e., taken along line J-J in FIG. 11). FIG. 10 is a side schematic view of the vertical section of the device, which is taken from a side direction (i.e., taken along line K-K in FIG. 11). FIG. 11 is a schematic cross-sectional view of the multi-nozzle section 51, taken along line H-H in FIG. 9, and shows a structure of flow channels. In addition, FIGS. 9 and 10 show a mold 61 disposed downstream of the multi-nozzle section 51.

A shut-off pin 52 runs through the central part of the multi-nozzle section 51. Four cylindrical flow channels F1, F2, F3, and F4 are disposed concentrically from outside to the center. These four flow channels narrow like a funnel shape as they come close to the downstream ends, and join together in a cylindrical joined flow channel 54. Among these flow channels, the channel F2 is provided with a pair of vertical blocking rib segments 53 in the tapered, downstream end portion so that the segments are disposed in the way to cross the channel F2, as shown in FIGS. 10 and 11. At downstream end portions F2a, the flow channel F2 forms the flow channels F2a in the shape of vertical strips.

The resin Ra used as the outer layer 31 (a PET resin in this embodiment) is supplied to the flow channel F1 by way of a incurrent channel Sa. The resin Rb used as the inner layer 32 (an EVOH resin in this embodiment) is supplied to the flow channel F3 by way of a incurrent channel Sb. The resin Rc used as the adhesive layer 33 and the inner support layer 34 (an APO resin in this embodiment) is supplied to the flow channels F2 and F4 by way of a incurrent channel Sc. These resins are supplied simultaneously. Inside the joined flow channel 54, four layers of the outer layer, the adhesive layers, the inner layer, and the inner support layer are laminated concentrically so that a cylindrical, laminated, molten resin mass is formed. (The adhesive layers are laminated in the shape of a vertical strip.)

The cylindrical, laminated, molten resin mass formed in the joined flow channel 54 is sent to the mold, passing through the sprue 63 and the gate 64 of the mold 61, and is injected into the cavity 62 to fill the cavity with the resin mass. Thus, the preform 21 having the laminar structure shown in FIG. 6 can be molded.

The features and action-and-effects of the container of this invention and the discharge container using this container have been described with respect to a preferred embodiment. However, the preferred embodiment and its variations have been mentioned each time when needed. Therefore, this invention should not be construed as limitative to this embodiment. For example, the container of the above embodiment was described as having a laminar structure comprising 3 resins and 4 layers. But in some structures, the lamination of the inner support layer and/or the adhesive layers may be omitted, depending on the combinations of resins to be used or on the purpose of use intended for the discharge container. Furthermore, the number of layers to be laminated can be increased, if necessary, so as to laminate a shielding layer to prevent light from transmitting or to laminate a printed layer for decoration.

The description of the above-described embodiment has been concerned with a container comprising an outer layer of a PET resin and an inner layer of an EVOH resin. However, another appropriate combination may be selected from among all kinds of other variations, giving consideration to moldability in the injection molding or the biaxial stretching and blow molding and/or functionality of the container when used as a container main-body of a discharge container. As regards the outer layer that forms an outer shell, it is necessary to make a choice, taking the biaxial stretching and blow molding into consideration. As the resins usable in the biaxial stretching and blow molding, there may be mentioned, a polyethylene naphthalate (PEN) resin, a resin of the PET series containing a copolymerizable component, a resin of the PP series, and a cyclic polyolefin resin, in addition to the PET resin. As for the resin to be used as the inner layer and the resin to be used as the inner support layer, an appropriate combination of resins may be selected, taking the moldability of the inner layer and the functions desired for the inner bag into consideration.

In the above embodiment, the discharge container with a pump shown in FIG. 5 was described as an example of a discharge container using the container of this invention as the delaminable container. Other than the container with a pump, the container of this invention can also be used as a discharge container of the squeeze type, such as shown in FIG. 12, which has been mentioned as an application to the delaminable container obtained by the direct blow molding. As another application, the container of this invention can be used as the container main-body for a liquid feeding device, which is configured to discharge a content fluid at a certain speed from a discharge nozzle disposed at the neck. Such a device utilizes compressed air from an air compressor or from a cylinder containing compressed air, and brings in the compressed air into a space between the outer layer and the inner layer through the air intake vent disposed in the bottom.

INDUSTRIAL APPLICABILITY

As described above, the biaxially stretched, blow molded container of this invention performs the delaminating function that is comparable to the delaminable bottle made by the direct blow molding. The container of this invention makes the best use of the characteristics of a biaxially stretched, blow molded container, and is expected to have a wide variety of use applications in the field of delaminable containers.

DESCRIPTION OF REFERENCE SIGNS

1; Container
2; Neck
2n; Neck ring
3; Shoulder
4; Body
5; Bottom
5w; Bottom wall
5g; Gate mark
6; Outer shell
7; Inner bag
9; Air intake vent
11; Outer layer
12; Inner layer
13; Adhesive layer
13a; Adhered zone
14; Inner support layer
15; Double layer
Bf; Interface of lamination
S; Space
21; Preform
22; Neck
22n; Neck ring
24; Body
25; Bottom
25w; Bottom wall
25g; Gate mark
25s; Sprue
31; Outer layer
32; Inner layer
33; Adhesive layer
34; Inner support layer
35; Double layer
41; Discharge container
42; Cap unit
43; Pump
F; Flow channel
L; Content fluid
51; Multi-nozzle section
52; Shut-off pin
53; Vertical blocking rib segment
54; Joined flow channel
61; Mold
62; Cavity
63; Sprue
64; Gate
F1, F2, F3, F4; Flow channel
F1a; Downstream end portion (of the flow channel F2)
Ra, Rb, Rc; Resin
Sa, Sb, Sc; Incurrent channel
101; Container
102; Neck
106; Outer shell
107; Inner bag
108; Bottom seal
109; Cap unit
109a; Spout
109Va, 109Vb; Check valve
111; Outer layer
112; Inner layer
113; Adhesive layer
113a; Adhered zone
119; Air intake vent
201; Preform
202; Neck
204; Body
205; Bottom
211; Substrate layer
212; Intermediate layer

The invention claimed is:
1. A biaxially stretched, blow molded container obtained by molding a laminated preform in a shape of a test tube, the preform being molded by an injection molding process using a multi-nozzle section, and the blow molded container being a bottle having a neck, a body, and a bottom, and comprising:
an outer layer that forms an outer shell, and
an inner layer that forms an inner bag to be laminated in a peelable manner with an inner surface of the outer layer,
wherein the inner layer is formed to have so thin a wall that the inner bag can be deflated under a pressure drop inside the inner bag caused by a decrease in volume of a content fluid;
wherein at least one adhesive layer in a shape of a vertical strip is laminated between the outer layer and the inner layer to adhere the outer layer and inner layer to each other,
the outer layer and the inner layer are of a laminar structure in which the lamination extends over an entire height range from a predetermined height position of the neck to a lower end face of a gate mark, which remains to exist at a center of a bottom plate of the bottom;
the outer layer and the inner layer are peeled from each other, starting from an interface of lamination between the outer layer and the inner layer, and the interface of lamination is exposed outside at the lower end face of the gate mark and can be used as an air intake vent that enables outside air to be taken into a space between the outer layer and the inner layer, and
the outer layer is made of a polyethylene terephthalate resin, the at least one adhesive layer is made of an adhesive polyolefin resin, and the inner layer is made of an ethylene vinyl alcohol copolymer resin.
2. The biaxially stretched, blow molded container according to claim 1,
wherein the inner bag is formed by the inner layer and an inner support layer laminated to an inner surface of the inner layer, wherein a double layer comprising the inner layer and the inner support layer is formed to have so thin a wall that the inner bag can be deflated under a pressure drop inside the inner bag caused by a decrease in volume of the content fluid.
3. The biaxially stretched, blow molded container according to claim 2,
wherein inner support layer is made of an adhesive polyolefin resin.

* * * * *